United States Patent [19]

Dell'Acqua et al.

[11] Patent Number: 4,775,850
[45] Date of Patent: Oct. 4, 1988

[54] THICK-FILM SENSOR, PARTICULARLY A PRESSURE SENSOR

[75] Inventors: Roberto Dell'Acqua, Pavia; Giuseppina Rossi, Travacò Siccomario, both of Italy

[73] Assignee: Marelli Autronica S.p.A., Milan, Italy

[21] Appl. No.: 27,279

[22] Filed: Mar. 10, 1987

[30] Foreign Application Priority Data

Mar. 10, 1986 [IT] Italy ............................. 53090/86[U]

[51] Int. Cl.$^4$ ............................................. G01L 1/22
[52] U.S. Cl. ......................................... 338/4; 338/5; 338/306; 338/307; 338/312; 338/47
[58] Field of Search ......................................... 338/2-5, 338/306, 307, 308, 47, 314, 312

[56] References Cited

U.S. PATENT DOCUMENTS

| | | | |
|---|---|---|---|
| 4,410,871 | 10/1983 | Mallor et al. | 338/5 |
| 4,510,671 | 4/1985 | Kurtz et al. | 338/4 X |
| 4,516,430 | 5/1985 | Kurtz et al. | 338/4 X |
| 4,524,625 | 6/1985 | Takeuchi | 338/4 X |

Primary Examiner—Clifford C. Shaw
Assistant Examiner—M. M. Lateef
Attorney, Agent, or Firm—Sughrue, Mion, Zinn, Macpeak & Seas

[57] ABSTRACT

In a thick-film pressure sensor comprising a support plate on at least one surface of which are deposited at least one thick-film resistor acting as a piezo-resistive transducer and at least one pair of thick-film conductors acting as rheophores, the at least one thick-film resistor and the thick-film conductors are covered with a protective layer of dielectric material.

4 Claims, 1 Drawing Sheet

THICK-FILM SENSOR, PARTICULARLY A PRESSURE SENSOR

BACKGROUND OF THE INVENTION

The present invention relates to a thick-film sensor, particularly a pressure sensor. The specific subject of the invention is a sensor of the type comprising a flexible support substrate in the form of a plate, on at least one surface of which are deposited at least one thick-film resistor acting as a piezo-resistive transducer and at least one pair of thick-film conductors acting as rheophores.

SUMMARY OF THE INVENTION

The sensor of the present invention is characterised in that the at least one thick-film resistor and the thick-film conductors are covered by a protective layer of dielectric material.

This protective layer of dielectric material is preferably also deposited by the thick-film technique.

Moreover, according to a further characteristic, this protective layer may extend over the entire surface of the support substrate.

By virtue of the presence of a protective layer of dielectric material, the sensor according to the invention may also be used in applications in which the support substrate must come into contract with aggressive fluids or electrical conductors.

Further characteristics and advantages of the sensor of the invention will become apparent from the detailed description which follows with reference to the appended drawings, provided purely by way of non-limiting example.

DETAILED DESCRIPTION OF THE INVENTION

Figure 1:
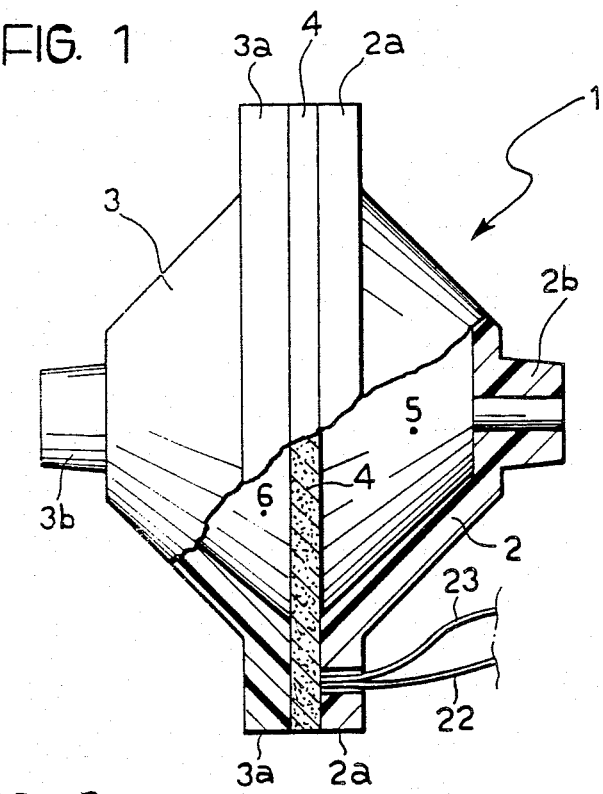
FIG. 1 is a partially-sectioned view of a differential pressure sensor made in accordance with the present invention.

In FIG. 1 a differential pressure sensor is generally indicated 1 and includes a housing comprised of two half-shells 2,3, for example of ceramics material, having respective flanged portions 2a and 3a between which a circular support plate 4 is clamped. This plate is also made, for example, of ceramics material. Alternatively, this plate could be of enamelled steel, for example.

The support plate 4 is clamped between the two half-shells 2 and 3 in any known manner.

Between the support plate 4 and the half-shells 2 and 3 are defined two chambers 5 and 6 respectively. These chambers can be put into communication with two different environments by connectors 2b and 3b formed integrally with the half-shells 2 and 3.

Figure 2:
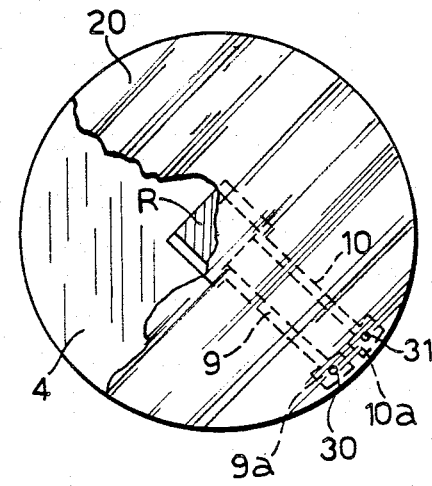

In the embodiment illustrated in FIG. 2, a thick-film resistor R is deposited on one surface of the support plate 4 by silk-screen printing. This resistor is connected to two thick-film conductors 9 and 10 which act as rheophores. In the embodiment illustrated by way of example, the rheophores 9 and 10 extend almost radially to the periphery of the support plate 4. The peripheral ends 9a and 10a of the rheophores are intended to allow the resistor R to be connected to external measuring circuits. In known manner, these circuits may include, for example, a so-called Wheatstone bridge to allow variations in the resistance of the resistor R to be detected.

According to the invention, a protective layer of dielectric material, indicated 20 in FIG. 2, is applied to the surface of the support plate 4 carrying the resistor R and its rheophores. The protective layer may be constituted, for example, by an electrically-insulating resin or by a vitreous paste, and it may conveniently be deposited by a silk-screen printing process.

In the embodiment illustrated in FIG. 2, the protective dielectric layer 20 covers practically the entire surface of the plate 4 carrying the thick-film resistor, with the sole exception of two areas 30, 31 in correspondence with the end portions 9a and 10a of the rheophores 9 and 10. it is thus possible to connect the rheophores 9 and 10 to external circuits through these uncovered areas 30 and 31, for example by conductors such as those indicated 22 and 23 in FIG. 1.

Figure 3:
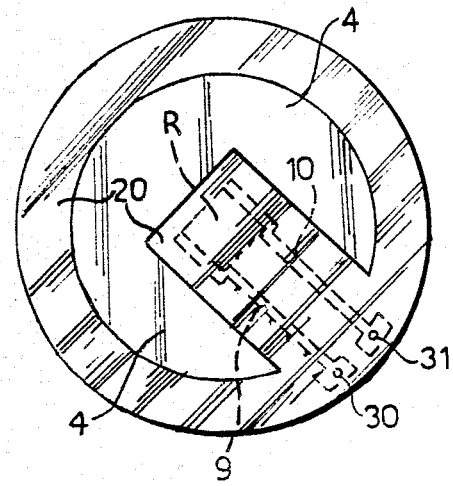
FIGS. 2 and 3 are plan views of two support substrates useable in a sensor according to the present invention.

In the embodiment illustrated in FIG. 3, the protective dielectric layer 20 does not cover the entire surface of the substrate 4 carrying the resistor R but covers only the resistor and its rheophores.

In use, the sensor shown in FIG. 1 is located in connection with two environments containing respective fluids. These fluids may even by aggressive, corrosive or electrically conductive. The support plate 4 is deformed in use to an extent which depends on the pressure difference between the chambers 5 and 6 of the sensor. The electrical resistance of the resistor R varies to a corresponding extent and this may be detected by the external circuits in known manner.

Naturally, the invention extends to all embodiments which achieve equal utility by using the same innovative concept.

In particular, the invention is not limited to embodiments in which the flexible support substrate carries a single thick-film resistor. Moreover, the invention is not intended to be limited in application solely to differential pressure sensors but rather its scope extends to all sensors using thick-film resistors as transducer elements.

We claim:

1. A thick-film sensor device, particularly but not exclusively a pressure sensor, comprising a support substrate in the form of a plate, housing means engaging said substrate about a peripheral portion thereof, at least one thick-film resistor which acts as a piezo-resistive transducer and at least one pair of thick-film conductors which act as rheophores being deposited on at least one surface of the plate with said conductors extending between said substrate and said housing means wherein said peripheral portion of said substrate, the at least one thick-film resistor and the thick-film conductors are covered with a protective layer of dielectric material.

2. A thick-film sensor according to claim 1, wherein the layer of protective material is deposited on the support substrate by the thick-film technique.

3. A thick-film sensor according to claim 1, wherein the protective layer is constituted by a vitreous matrix material.

4. A sensor according to claim 1, wherein the protective layer is constituted by an electrically-insulating resin.

* * * * *